(12) United States Patent
Park et al.

(10) Patent No.: US 11,415,692 B2
(45) Date of Patent: Aug. 16, 2022

(54) HIGH-RESOLUTION FULLY POLARIMETRIC FREQUENCY MODULATION CONTINUOUS WAVE IMAGE RADAR SYSTEM USING RF SWITCH AND IMAGE PROCESSING METHOD THEREFOR

(71) Applicant: Korea Advanced Institute of Science and Technology, Daejeon (KR)

(72) Inventors: SeongOok Park, Daejeon (KR); Dae-hwan Jung, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 316 days.

(21) Appl. No.: 16/717,970

(22) Filed: Dec. 17, 2019

(65) Prior Publication Data
US 2020/0217951 A1  Jul. 9, 2020

(30) Foreign Application Priority Data

Jan. 4, 2019 (KR) .......................... 10-2019-0000970

(51) Int. Cl.
*G01S 13/90* (2006.01)
*G01S 7/02* (2006.01)
*G01S 7/35* (2006.01)

(52) U.S. Cl.
CPC .......... *G01S 13/9076* (2019.05); *G01S 7/025* (2013.01); *G01S 7/352* (2013.01); *G01S 7/356* (2021.05)

(58) Field of Classification Search
None
See application file for complete search history.

(56) References Cited

U.S. PATENT DOCUMENTS

| 8,125,370 | B1* | 2/2012 | Rogers ................. | G01S 13/904 |
| | | | | 342/25 R |
| 11,194,014 | B1* | 12/2021 | Jackson ................. | G01S 7/024 |
| 2010/0207808 | A1* | 8/2010 | Prats ..................... | G01S 13/904 |
| | | | | 342/25 F |
| 2018/0003815 | A1* | 1/2018 | Ranney ................. | G01S 13/904 |

* cited by examiner

*Primary Examiner* — Whitney Moore
(74) *Attorney, Agent, or Firm* — Leber IP Law; David C. Robertson

(57) ABSTRACT

A high-resolution fully polarimetric frequency modulation continuous wave (FMCW) image radar system using an RF switch and an image processing method are provided. The image radar system includes a signal generator that generates a frequency modulation signal, a transmitter that radiates the frequency modulation signal as vertical polarization and horizontal polarization using a vertically polarized transmit antenna and a horizontally polarized transmit antenna, a receiver that receives a signal in which a vertically polarized signal and a horizontally polarized signal are reflected from an object, using a vertically polarized receive antenna and a horizontally polarized receive antenna, and generates a VV/HV polarization data set and a VH/HH polarization data set based on the signal received via the vertically polarized receive antenna and the horizontally polarized receive antenna, and a signal processor that obtains a fully polarimetric radar image based on bilateral symmetry correction and azimuth compression.

4 Claims, 7 Drawing Sheets

HIGH-RESOLUTION FULLY POLARIMETRIC FREQUENCY MODULATION CONTINUOUS WAVE IMAGE RADAR SYSTEM USING RF SWITCH AND IMAGE PROCESSING METHOD THEREFOR

CROSS-REFERENCE TO RELATED APPLICATIONS

A claim for priority under 35 U.S.C. § 119 is made to Korean Patent Application No. 10-2019-0000970 filed on Jan. 4, 2019, in the Korean Intellectual Property Office, the entire contents of which are hereby incorporated by reference.

BACKGROUND

Embodiments of the inventive concept described herein relate to an image radar system and an image processing method therefor, and more particularly, relate to an image radar system for obtaining an image using a fully polarimetric frequency modulation continuous wave (FMCW) and obtaining a high-resolution fully polarimetric radar image through image processing of the obtained image and an image processing method therefor.

Recently, research, for example, research purposes for geographic features, urban planning, natural environment monitoring, and crop management, has been actively done in many research centers and companies for an image radar (a synthetic aperture radar (SAR)). The image radar may simultaneously obtain an image and distance information in any weather when detecting any area. Thus, it is expected that the utilization of the image radar will increase sharply in the future.

Radio waves are classified into vertical polarization and horizontal polarization according to linear polarization directions of antennas. Most basic image radars obtain images using single polarization. Because a single polarization radar forms an image with only a receive power of the radar, it obtains gray scale images. However, when a transmitter of an image radar system radiates radio waves as vertical and horizontal polarization and when a receiver thereof receives radio waves as vertical and horizontal polarization, the receiver may receive radio waves as horizontal-to-horizontal (HH) polarization (transmits radio waves as horizontal polarization and receives radio waves as horizontal polarization), horizontal-to-vertical (HV) polarization (transmits radio waves as horizontal polarization and receives radio waves as vertical polarization), vertical-to-horizontal (VH) polarization (transmits radio waves as vertical polarization and receives radio waves as horizontal polarization), and vertical-to-vertical (VV) polarization (transmits radio waves as vertical polarization and receives radio waves as vertical polarization). The intensity or types of reflected polarization vary with properties of an object which receives and reflects the radiated radio waves. Thus, images generated by HH polarization, HV polarization, VH polarization, and VV polarization differ from each other. Another color is added according to such a polarization combination to obtain a color image. This has a clear difference with a black and white image obtained through single polarization. Thus, a fully polarimetric radar is more advantageous than a single polarization radar to classify targets, analyze components, and detect subtle changes of geographic features using polarization characteristics according to quantitative and qualitative characteristic of the geographic features.

In an image radar system commonly used for an airplane or satellite, the system is configured based on a pulse radar. However, because the pulse radar radiates high-power radio waves in a short time, it has high complexity of the system and is difficult to implement the system. Because the pulse radar has high system power consumption, it is disadvantageous in terms of small size.

SUMMARY

Embodiments of the inventive concept provide an image radar system for obtaining an image using a fully polarimetric FMCW and obtaining a high-resolution fully polarimetric radar image through image processing of the obtained image and an image processing therefor.

According to an exemplary embodiment, an image radar system may include a signal generator that generates a frequency modulation signal which is linearly changed over time, a transmitter that radiates the frequency modulation signal as vertical polarization and horizontal polarization at a pulse repetition interval using a vertically polarized transmit antenna and a horizontally polarized transmit antenna, a receiver that receives a signal in which a vertically polarized signal and a horizontally polarized signal radiated at the pulse repetition interval are reflected from an object, using a vertically polarized receive antenna and a horizontally polarized receive antenna, and generates a vertical-to-vertical/horizontal-to-vertical (VV/HV) polarization data set including VV polarization data and HV polarization data and a vertical-to-horizontal/horizontal-to-horizontal (VH/HH) polarization data set including VH polarization data and HH polarization data based on the signal received via the vertically polarized receive antenna and the horizontally polarized receive antenna, and a signal processor that obtains a fully polarimetric radar image based on bilateral symmetry correction and azimuth compression with respect to each of the VV/HV polarization data set and the VH/HH polarization data set.

The signal processor may perform range compression and azimuth fast Fourier transform (FFT) with respect to each of the VV/HV polarization data set and the VH/HH polarization data set, may perform range cell migration correction (RCMC), may perform bilateral symmetry correction with respect to each of the data sets in which the RCMC is performed, and may perform azimuth inverse FFT (IFFT) to obtain a VV polarization radar image and a VH polarization radar image, and may perform azimuth compression with respect to each of the data sets in which the RCMC is performed and may perform azimuth IFFT to obtain an HV polarization radar image and an HH polarization radar image.

The signal processor may obtain the fully polarimetric radar image, irrespective of information about the pulse repetition interval.

The signal generator may generate the frequency modulation signal in the form of a triangle wave.

The transmitter may include a radio frequency (RF) switch that switches the frequency modulation signal at the pulse repetition interval, a first frequency up-converter that converts the frequency modulation signal received via the RF switch into a predetermined frequency band and provides the converted signal to the vertically polarized transmit antenna, and a second frequency up-converter that converts the frequency modulation signal received via the RF switch into the frequency band and provides the converted signal to the horizontally polarized transmit antenna.

The receiver may include a first frequency mixer that mixes a signal received via the vertically polarized receive antenna and the frequency modulation signal to be converted into a beat frequency component including distance information and Doppler information of the object, a second frequency mixer that mixes a signal received via the horizontally polarized receive antenna and the frequency modulation signal to be converted into a beat frequency component including distance information and Doppler information of the object, a first baseband receiver that generates the VV/HV polarization data set based on the beat frequency component converted by the first frequency mixer, and a second baseband receiver that generates the VH/HH polarization data set based on the beat frequency component converted by the second frequency mixer.

Each of the vertically polarized transmit antenna, the horizontally polarized transmit antenna, the vertically polarized receive antenna, the horizontally polarized receive antenna may include a corrugated horn antenna.

According to an exemplary embodiment, an image radar operation method may include generating a frequency modulation signal which is linearly changed over time, radiating the frequency modulation signal as vertical polarization and horizontal polarization at a pulse repetition interval using a vertically polarized transmit antenna and a horizontally polarized transmit antenna, receiving a signal in which a vertically polarized signal and a horizontally polarized signal radiated at the pulse repetition interval are reflected from an object, using a vertically polarized receive antenna and a horizontally polarized receive antenna, generating a VV/HV polarization data set including VV polarization data and HV polarization data and a VH/HH polarization data set including VH polarization data and HH polarization data based on the signal received via the vertically polarized receive antenna and the horizontally polarized receive antenna, and obtaining a fully polarimetric radar image based on bilateral symmetry correction and azimuth compression with respect to each of the VV/HV polarization data set and the VH/HH polarization data set.

The obtaining of the fully polarimetric radar image may include performing range compression and azimuth FFT with respect to each of the VV/HV polarization data set and the VH/HH polarization data set, performing RCMC, performing bilateral symmetry correction with respect to each of the data sets in which the RCMC is performed, and performing azimuth IFFT to obtain a VV polarization radar image and a VH polarization radar image and performing azimuth compression with respect to each of the data sets in which the RCMC is performed and performing azimuth IFFT to obtain an HV polarization radar image and an HH polarization radar image.

The obtaining of the fully polarimetric radar image may include obtaining the fully polarimetric radar image, irrespective of information about the pulse repetition interval.

The generating of the frequency modulation signal may include generating the frequency modulation signal in the form of a triangle wave.

The radiating may include switching the frequency modulation signal at the pulse repetition interval and converting the switched frequency modulation signal into a predetermined frequency band and sequentially provide the converted signal to the vertically polarized transmit antenna and the horizontally polarized transmit antenna to radiate the vertically polarized signal and the horizontally polarized signal respectively.

The generating of the data sets may include mixing a signal received via the vertically polarized receive antenna and the frequency modulation signal to be converted into a first beat frequency component including distance information and Doppler information of the object and generating the VH/HH polarization data set based on the converted first beat frequency component and mixing a signal received via the horizontally polarized receive antenna and the frequency modulation signal to be converted into a second beat frequency component including distance information and Doppler information of the object and generating the VH/HH polarization data set based on the converted second beat frequency component.

According to an exemplary embodiment, an image processing method may include receiving a VV/HV polarization data set including VV polarization data and HV polarization data and a VH/HH polarization dataset including VH polarization data and HH polarization data and obtaining a fully polarimetric radar image based on bilateral symmetry correction and azimuth compression with respect to each of the VV/HV polarization data set and the VH/HH polarization data set.

The obtaining of the fully polarimetric radar image may include performing range compression and azimuth FFT with respect to each of the VV/HV polarization data set and the VH/HH polarization data set, performing RCMC, performing bilateral symmetry correction with respect to each of the data sets in which the RCMC is performed, and performing azimuth IFFT to obtain a VV polarization radar image and a VH polarization radar image.

The obtaining of the fully polarimetric radar image may include performing range compression and azimuth FFT with respect to each of the VV/HV polarization data set and the VH/HH polarization data set, performing RCMC, performing azimuth compression with respect to each of the data sets in which the RCMC is performed, and performing azimuth IFFT to obtain an HV polarization radar image and an HH polarization radar image.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
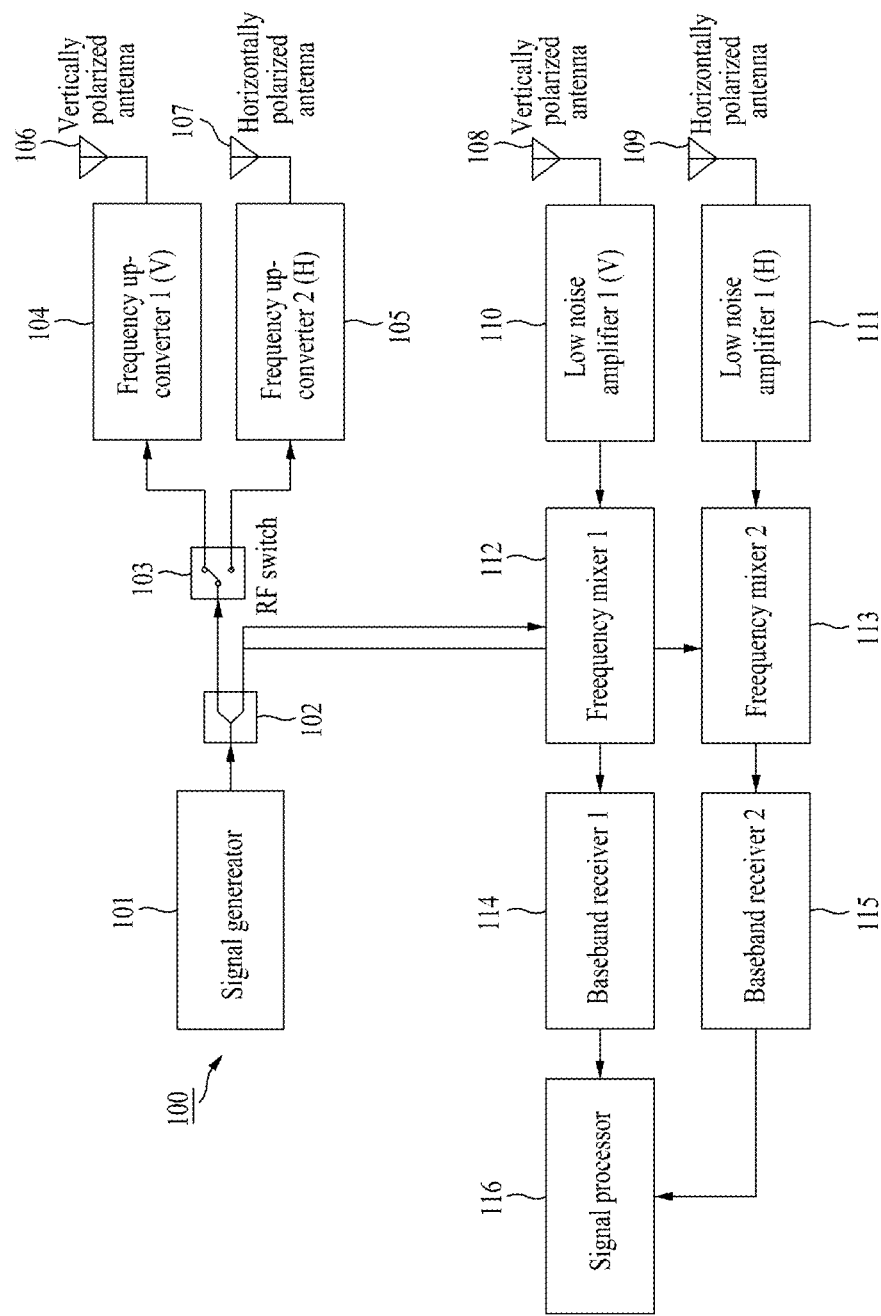
FIG. 1 is a block diagram illustrating a configuration of a fully polarimetric FMCW image radar system according to an embodiment of the inventive concept.

Advantages, features, and methods of accomplishing the same will become apparent with reference to embodiments described in detail below together with the accompanying drawings. However, the inventive concept is not limited by embodiments disclosed hereinafter, and may be implemented in various forms. Rather, these embodiments are provided to so that this disclosure will be through and complete and will fully convey the concept of the invention to those skilled in the art, and the inventive concept will only be defined by the appended claims.

Terms used in the specification are used to describe embodiments of the inventive concept and are not intended to limit the scope of the inventive concept. In the specification, the terms of a singular form may include plural forms unless otherwise specified. The expressions "comprise" and/or "comprising" used herein indicate existence of one or more other components, steps, operations, and/or elements other than stated, components, steps, operations, and/or elements but do not exclude presence of additional elements.

Unless otherwise defined herein, all terms (including technical and scientific terms) used in the specification may have the same meaning that is generally understood by a person skilled in the art. Also, terms which are defined in a dictionary and commonly used should be interpreted as not in an idealized or overly formal detect unless expressly so defined.

Hereinafter, a description will be given in detail of exemplary embodiments of the inventive concept with reference to the accompanying drawings. Like reference numerals are used for the same components shown in each drawing, and a duplicated description of the same components will be omitted.

Embodiments of the inventive concept are the gist of obtaining a fully polarimetric radar image using an FMCW radar.

In this case, embodiments of the inventive concept may not need to cut data accurately for each polarization by using triangle-wave frequency modulation rather than sawtooth-wave frequency modulation. Thus, embodiments of the inventive concept may not need to store a pulse of the same period as an RF switch control voltage as data.

Embodiments of the inventive concept may use an FMCW radar rather than a pulse radar which is universally used.

In this case, to enhance efficiency of a system according to an embodiment of the inventive concept, the system may input a linear frequency modulation waveform generated by one signal generator to two frequency up-converters in response to a pulse identical to a pulse repetition interval (PRI) using an RF switch to radiate the linear frequency modulation waveform in both of a vertical polarization method and a horizontal polarization method. Because a direct leakage signal generated as a signal radiated from a transmitter is immediately input to a receiver results in performance degradation which is fatal to the system, the system may more reduce a sidelobe using a corrugated horn antenna than a basic horn antenna to physically reduce the direct leakage signal. Furthermore, the system according to an embodiment of the inventive concept may be easy to obtain a signal to noise ratio (SNR) sufficient for obtaining an image because of having a high antenna gain.

A conventional image radar signal generator may use a frequency modulation signal of a sawtooth shape for performing frequency modulation with one type of slope. When performing Fourier transform to obtain range direction data, the conventional image radar signal generator may use only one negative or positive frequency. Furthermore, a synchronization signal for distinguishing each polarization may be obtained at the same time of obtaining data, and the obtained synchronization signal should be needed when processing a signal. Due to this, a configuration of a conventional system becomes complicated.

Thus, embodiments of the inventive concept may generate, at a signal generator, a frequency modulation signal in the form of a triangle wave. When performing Fourier transform to obtain range direction data, embodiments of the inventive concept may process two types of polarization data at the same time on different domains such as a negative frequency domain and a positive frequency domain, thus reducing complexity of an algorithm. Because it is unnecessary to obtain a synchronization signal for distinguishing each polarization at the same time as obtaining data, the system may be configured in a simpler form and performance requirements of necessary components may be reduced.

Hereinafter, a description will be given of a system and an image processing method according to an embodiment of the inventive concept with reference to FIGS. 1 to 7.

FIG. 1 is a block diagram illustrating a configuration of a fully polarimetric FMCW image radar system according to an embodiment of the inventive concept.

Referring to FIG. 1, a fully polarimetric FMCW image radar system 100 according to an embodiment of the inventive concept may be a system configured with a basic FMCW radar to obtain a color-coded fully polarimetric radar image and may include a signal generator 101, a power splitter 102, a radio frequency (RF) switch 103, frequency up-converters 104 and 105, antennas 106 to 109, low noise amplifiers 110 and 111, frequency mixers 112 and 113, baseband receivers 114 and 115, and a signal processor 116.

The signal generator 101 may generate a linear frequency modulation signal.

In this case, the signal generator 101 may generate the frequency modulation signal in the form of a triangle wave.

The signal generated by the signal generator 101 may be divided into a local oscillator signal used for the frequency mixers 112 and 113 of a receiver and a signal input to the frequency up-converters 104 and 105 via the power splitter 102.

Because a system according to an embodiment of the inventive concept radiates radio waves as vertical polarization one time and as horizontal polarization another time when transmitting the radio waves, a control voltage pulse identical to a pulse repetition interval (PRI) may be input to the RF switch 103. Radio waves may be input to the frequency up-converter 104 in one sweep period, and radio waves may be input to the frequency up-converter 105 in another sweep period.

The radio waves converted into a Ku-band by the frequency up-converters 104 and 105 may be radiated from the antenna 106 which radiates the radio waves as vertical polarization and the antenna 107 which radiates the radio waves as horizontal polarization. The radiated vertically polarized signal and horizontally polarized signal may be reflected from geographic features and may be received at the vertically polarized receive antenna 108 and the horizontally polarized receive antenna 109.

Herein, each of the vertically polarized transmit antenna 106 and the horizontally polarized transmit antenna 107 may be a corrugated horn antenna, and each of the vertically polarized receive antenna 108 and the horizontally polarized receive antenna 109 may also be the corrugated horn antenna.

The low noise antennas 110 and 111 may frequency down-convert and simultaneously amplify the vertically polarized signal and the horizontally polarized signal received via the vertically polarized receive antenna 108 and the horizontally polarized receive antenna 109, respectively, and may input the amplified signals to the frequency mixers 112 and 113, respectively.

Each of the frequency mixers 112 and 113 may mix a local oscillator signal received via the power splitter 102 and a signal received via each of the low noise amplifier 110 and 111 to be converted into a beat frequency component indicating distance information and Doppler information of a target.

Each of the baseband receivers 114 and 115 may perform analog-to-digital conversion of the beat frequency component and may store the converted data in a storage device (not shown).

The signal processor 116 may perform image processing of raw data obtained via the baseband receivers 114 and 115 using an image processing algorithm according to an embodiment of the inventive concept to obtain a fully polarimetric FMCW radar image.

Herein, the signal processor 116 may receive both of a vertical-to-vehicle/horizontal-to-vertical (VV/HV) polarization data set and a vertical-to-horizontal/horizontal-to-horizontal (VV/HH) polarization data set via the baseband receivers 114 and 115. The signal processor 116 may perform range compression, for example, range fast Fourier transform (FFT) and azimuth FFT, with respect to each of the received data sets. The signal processor 116 may perform range cell migration correction (RCMC) with respect to each of the data sets in which the azimuth FFT is performed. The signal processor 116 may perform bilateral symmetry correction, for example, conjugate azimuth compression and azimuth inverse FFT (IFFT, with respect to each of the data sets in which the RCMC is performed, to obtain a VV polarization image and a VH polarization image. The signal processor 116 may perform azimuth compression with respect to each of the data sets in which the RCMC is performed and may perform azimuth IFFT to obtain an HV polarization image and an HH polarization image.

Herein, when a platform equipped with a radar system passes by any point target, range cell migration means that a distance between the point target and the platform is changed. However, the distance is more changed than resolution of the radar system, the change may be displayed in the form of an are and it is unable to perform azimuth compression. Thus, signal processing of flattening the arc in the form of a straight line to synthesize the arc is RCMC.

Figure 2:
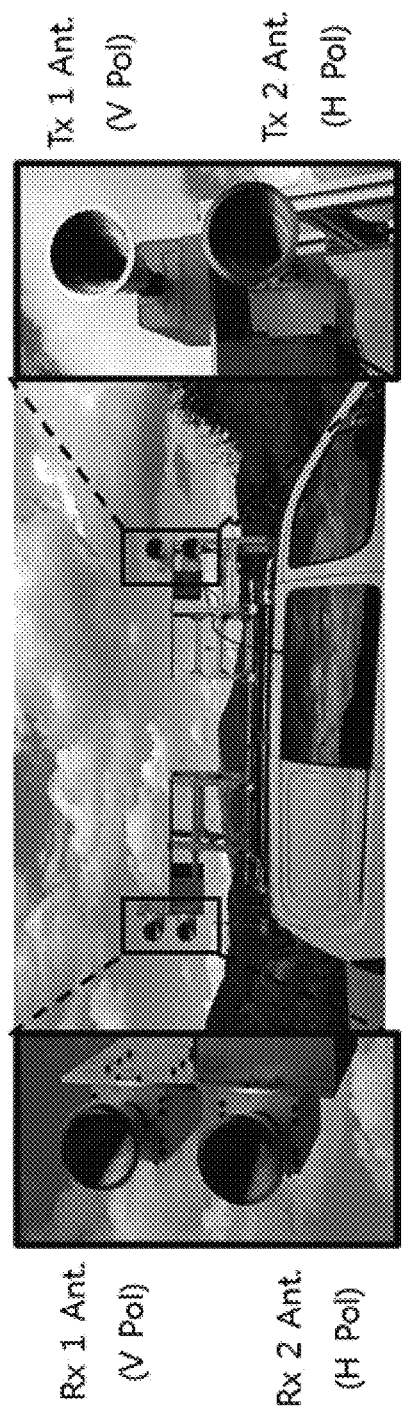
FIG. 2 is a photo illustrating an example of fixing a fully polarimetric FMCW radar system according to an embodiment of the inventive concept to a vehicle.

FIG. 2 is a photo illustrating an example of fixing a fully polarimetric FMCW radar system according to an embodiment of the inventive concept to a vehicle. As shown in FIG. 2, the appearance of fixing the fully polarimetric FMCW radar system according to an embodiment of the inventive concept to the vehicle when performing a test on obtaining radar data using the fully polarimetric FMCW radar system mounted on the vehicle is shown. An FMCW radar has a serious effect on image performance due to a direct leakage signal which is immediately input from a transmitter to a receiver. Thus, an embodiment of the inventive concept may reduce the direct leakage signal using a corrugated horn antenna with a lower sidelobe than a general horn antenna.

Figure 3:
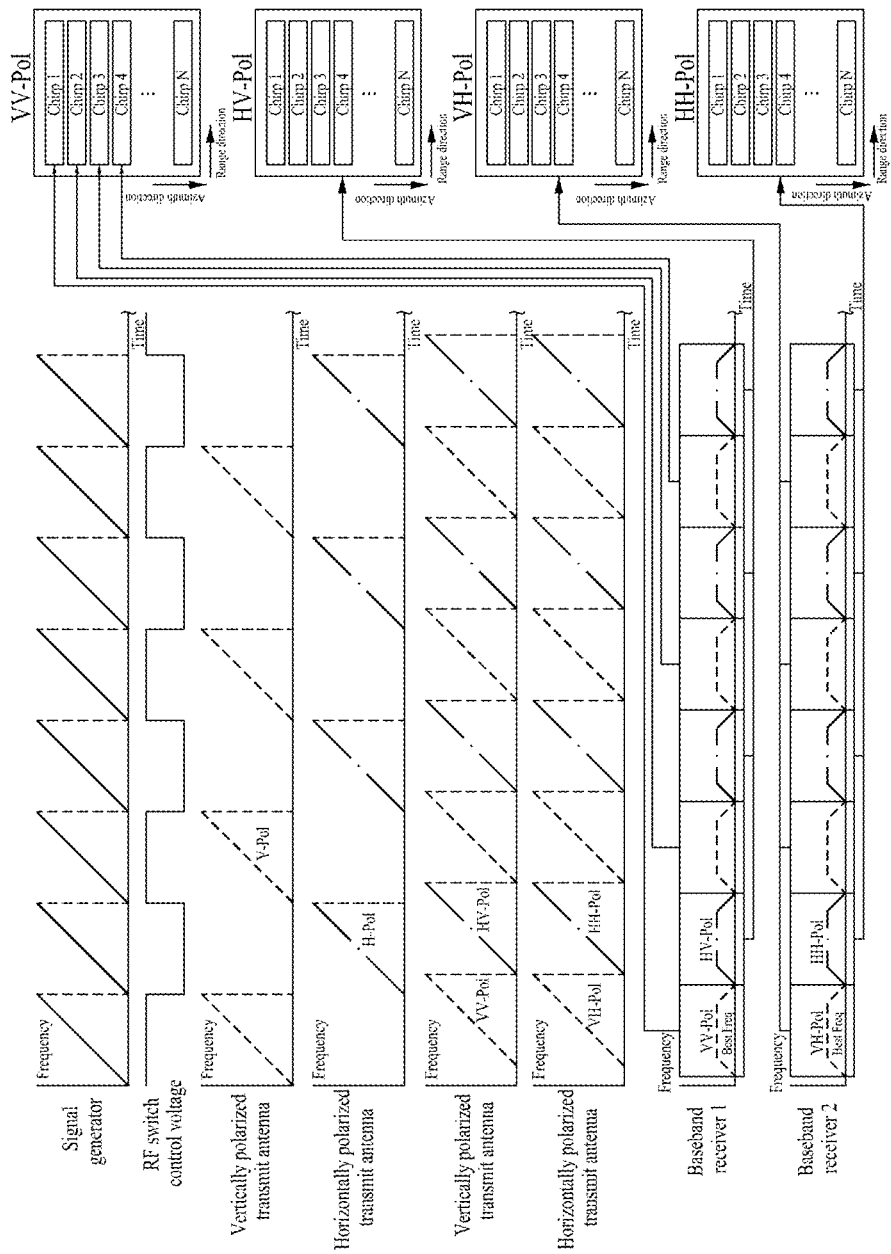
FIG. 3 is a drawing illustrating signaling flow when using a frequency modulation transmission signal in the form of a sawtooth wave in a system according to an embodiment of the inventive concept.

FIG. 3 is a drawing illustrating signaling flow when using a frequency modulation transmission signal in the form of a sawtooth wave in a system according to an embodiment of the inventive concept. A pulse chirp radar as well as an FMCW radar system uses a sawtooth wave frequency modulation signal model which is more commonly used as a transmit signal.

As shown in FIG. 3, when a signal generator generates a frequency modulation signal in the form of a sawtooth wave, the frequency modulation signal may be divided and provided to a vertically polarized transmit antenna and a horizontally polarized transmit antenna by an RF switch control voltage via frequency up-converters, and radio waves may be radiated. A vertically polarized receive antenna may receive both of two signals radiated as different polarization and may receive signals in the form of VV-polarization (VV-Pol) and HV-Pol. A horizontally polarized receive antenna may receive both of two signals radiated as different polarization and may receive signals in the form of VH-Pol and HH-Pol. Each of baseband receivers may store digital data in the form of a beat frequency indicating distance information and speed information through frequency mixers.

Figure 4:
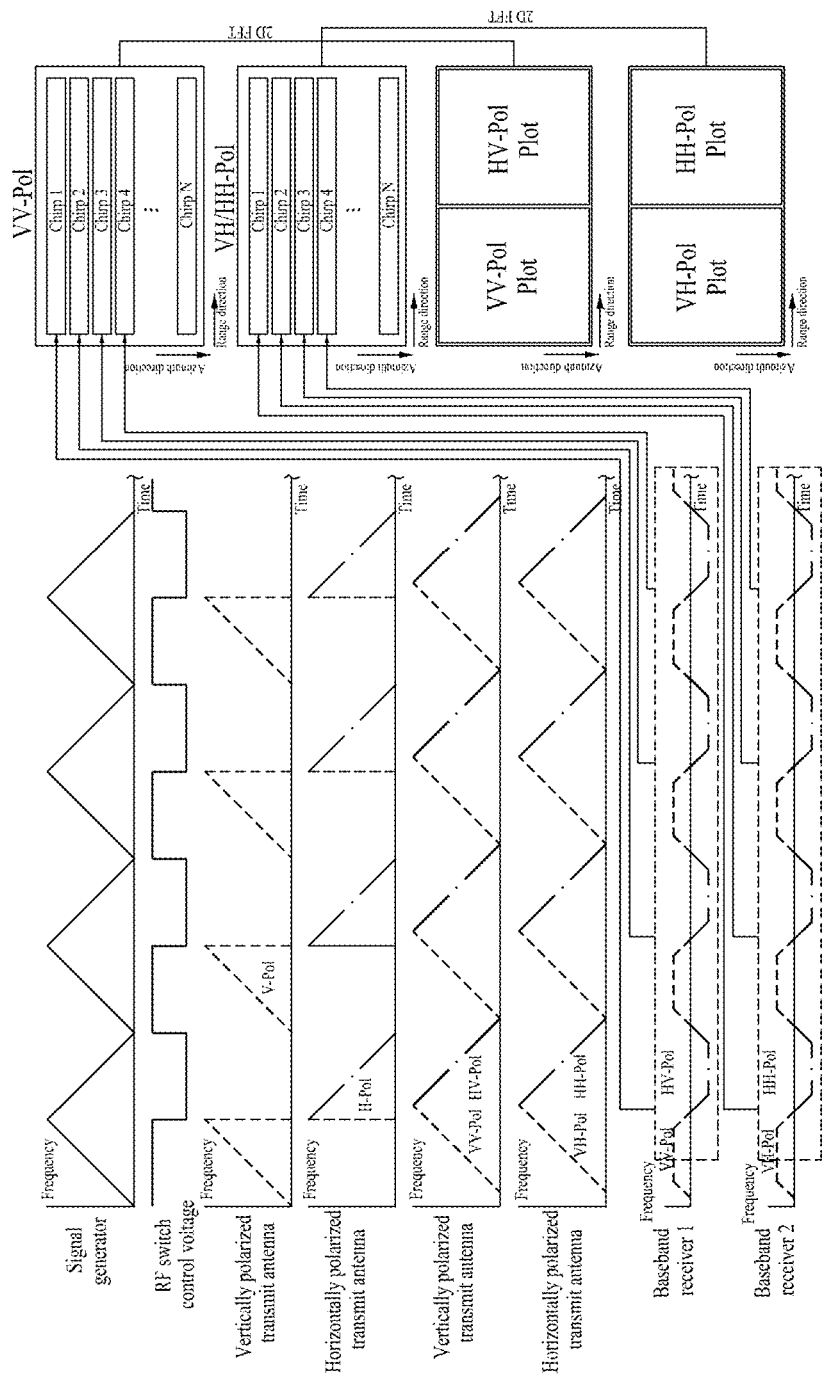
FIG. 4 is a drawing illustrating signaling flow when using a frequency modulation transmission signal in the form of a triangle wave in a system according to an embodiment of the inventive concept.

FIG. 4 is a drawing illustrating signaling flow when using a frequency modulation transmission signal in the form of a triangle wave in a system according to an embodiment of the inventive concept. A triangle wave frequency modulation model rather than a sawtooth wave frequency modulation model is used as a fully polarimetric radar signaling technique proposed in an embodiment of the inventive concept.

As shown in FIG. 4, when a signal generator generates a frequency modulation signal in the form of a triangle wave, the frequency modulation signal may be divided and provided to a vertically polarized transmit antenna and a horizontally polarized transmit antenna by an RF switch control voltage via frequency up-converters, and radio waves may be radiated. A vertically polarized receive antenna may receive both of two signals radiated as different polarization and may receive a signal in the form of VV/HV-Pol. A horizontally polarized receive antenna may receive both of two signals radiated as different polarization and may receive a signal in the form of VH/HH-Pol. Each of baseband receivers may store digital data in the form of a beat frequency indicating distance information and speed information through frequency mixers. In other words, the baseband receiver may store digital data with respect to a total of 4 polarization models, for example, VV-Pol, VH-Pol, HV-Pol, and HH-Pol.

Comparing FIG. 3 with FIG. 4, an RF switch control voltage should be stored in the form of digital data in a data acquisition system in FIG. 3, whereas there is no need to store the RF switch control voltage in the form of digital data in the data acquisition system in FIG. 4 such that the complexity of the system may be reduced. Furthermore, each polarization model should be cut into data at a pulse of the same period as the RF switch control voltage by accurate timing and should be sequentially stored in 4 sets including VV-Pol, HV-Pol, VH-Pol, and HH-Pol data in FIG. 3, whereas, because there is no need to accurately cut data for each polarization in FIG. 4, there is no need to store a pulse of the same period as the RF switch control voltage as data. Because a current system knows a data sampling rate, the baseband receiver simultaneously cuts two polarization models irrespective of a start point in response to the number of data to be stored in one period and stores the cut polarization modes in turn in two sets including (VV, HV) and (VH, HH) polarization data.

In other words, a total of 4 signaling should be performed in FIG. 3 by applying a signaling algorithm to 4 sets of raw data of VV-Pol, HV-Pol, VH-Pol, and HH-Pol, whereas a signaling algorithm is applied to 2 sets (VV, HV) and (VH, HH) of raw polarization data in FIG. 4 to be high efficiency in terms of signaling. Furthermore, when 2D FFT of 2 sets including raw polarization data is performed, VV and HV images may be simultaneously obtained from one data set (VV, HV) and VH and HH images may be simultaneously obtained from another data set (VH, HH).

Upon a sawtooth wave signal having frequency-up modulation as shown in FIG. 3, the signal generated by the signal generator may be represented as Equation 1 below.

$$S_{TX} = \exp\left(j2\pi\left(f_c t + \frac{1}{2}\frac{B_s}{T_s}t^2\right)\right) \quad \text{[Equation 1]}$$

Herein, $f_c$ refers to the central frequency, $B_s$ refers to the sweep bandwidth, and $T_s$ refers to the sweep period.

The signal input to a receiver by a time delay which occurs while the radiated radio waves are hit and returned from a target may be represented as Equation 2 below.

$$S_{RX} = \exp\left(j2\pi\left(f_c(t-\tau) + \frac{1}{2}\frac{B_s}{T_s}(t-\tau)^2\right)\right) \quad \text{[Equation 2]}$$

Thereafter, an IF signal having distance information and speed information, which is down-converted at the frequency mixer by a local oscillator signal, may be output. The IF signal may be represented as Equation 3 below.

$$S_{IF} = \exp\left(j2\pi\left(-f_c\tau - \frac{B_s}{T_s}\tau t + \frac{1}{2}\frac{B_s}{T_s}\tau^2\right)\right) \quad \text{[Equation 3]}$$

As such, when a signal received at one period is generated as raw data sets as shown in FIG. 3, the signal may be represented as Equation 4 below.

$$S_{VV,VH} = \quad \text{[Equation 4]}$$
$$\exp\left(j2\pi\left(-f_c\tau - \frac{B_s}{T_s}\tau t + \frac{1}{2}\frac{B_s}{T_s}\tau^2\right)\right)\omega_a(\eta - \eta_c)\exp(j\pi K_a \eta)$$

Upon triangle wave frequency modulation as shown in FIG. 4, VV-Pol and VH-Pol using frequency-up modulation may be represented as Equation 4 above and HV-Pol and HH-Pol using frequency-down modulation may be represented as Equation 5 below.

$$S_{HV,HH} = \quad \text{[Equation 5]}$$
$$\exp\left(j2\pi\left(-f_c\tau + \frac{B_s}{T_s}\tau t - \frac{1}{2}\frac{B_s}{T_s}\tau^2\right)\right)\omega_a(\eta - \eta_c)\exp(j\pi K_a \eta)$$

Herein, $\omega_a$ refers to the azimuth envelope and $K_a$ refers to the azimuth chirp rate. The beat frequency having the distance information is $$\frac{B_s}{T_s}\tau.$$

As may be observed in Equation 4 above, VV-Pol and VH-Pol have (−) sign. As may be observed in Equation 5 above, HV-Pol and HH-Pol have (+) sign. As shown in FIG. 4, upon signaling, VV-Pol data may be placed in the left of the first data set, and HV-Pol data may be placed in the right of the first data set. Because the left and the right in the first data set have opposite signs, the first data set may have a form which is accurately symmetric vertically.

Figure 5:
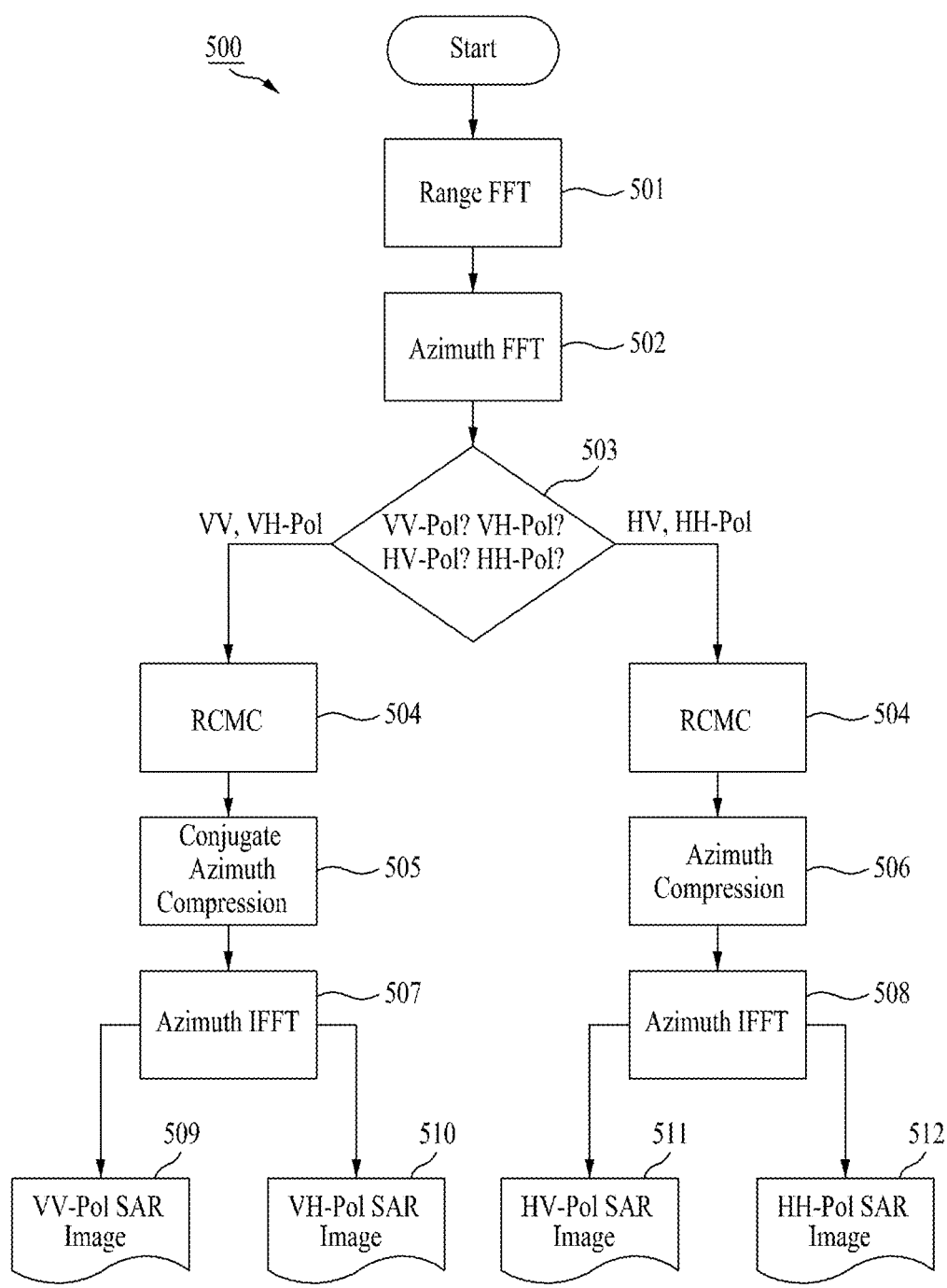
FIG. 5 is an operational flowchart illustrating a method for processing a fully polarimetric FMCW radar image according to an embodiment of the inventive concept.

FIG. 5 is an operational flowchart illustrating a method for processing a fully polarimetric FMCW radar image according to an embodiment of the inventive concept.

Referring to FIG. 5, an image processing method 500 according to an embodiment of the inventive concept may be performed based on a range Doppler algorithm (RDA) frequently used as a conventional radar image processing algorithm.

In detail, in a first operation of the method according to an embodiment of the inventive concept, unlike a type of a pulse radar, as part of range compression, an FMCW system may perform FFT of two data sets, for example, a VV/HV polarization data set and a VH/HH polarization data set, received via baseband receivers to extract distance information within a quick calculation time. The first operation may be range FFT 501.

Thereafter, similar to the conventional RDA, azimuth FFT 502 of the two data sets may be performed.

To extract an image for each polarization mode from the two data sets in which the azimuth FFT is performed and obtain a fully polarimetric radar image, for example, a VV polarization image and a VH polarization image in operation 503, RCMC 504 may be performed. Seeing a form of the image, an image of two polarization modes in one data set is symmetrical vertically, and the image should be generated as an image of the same form by correcting the bilateral symmetry of the image. Bilateral symmetry of VV-Pol data and VH-Pol data, each of which has a negative frequency as a beat frequency, should be corrected through signal processing, for example, conjugate azimuth compression 505. The result of taking the conjugate in VV-Pol and VH-Pol data to be symmetrical vertically may be represented as Equation 6 below.

$$S_{VV,VH}^*(f_\tau, f_\eta) = P_r\left(f_\tau - \frac{B_s}{T_s}\frac{2R}{c}\right)W_a(f_\eta - f_{\eta_c})\exp\left(-j\pi\frac{f_\eta^2}{K_a}\right) \quad \text{[Equation 6]}$$

Herein, $P_r(\bullet)$ refers to the impulse response.

In contrast, to obtain an HV polarization image and an HH polarization image in operation 503 from the two data sets in which the azimuth FFT is performed, the RCMC 504 may be performed and azimuth compression may be performed. HV-Pol and HH-Pol signals may represent a formula before the azimuth compression as Equation 7 below.

$$S_{HV,HH}(f_\tau, f_\eta) = P_r\left(f_\tau - \frac{B_s}{T_s}\frac{2R}{c}\right)W_a(f_\eta - f_{\eta_c})\exp\left(-j\pi\frac{f_\eta^2}{K_a}\right) \quad \text{[Equation 7]}$$

As may be observed in Equations 6 and 7 above, because signs of the final terms differ from each other, matched filters for the azimuth compression may differ from each other like Equations 8 and 9 below.

$$H_{az,VV,VH}(f_\eta) = \exp\left\{j\pi\frac{f_\eta^2}{K_a}\right\}$$ [Equation 8]

$$H_{az,HV,HH}(f_\eta) = \exp\left\{-j\pi\frac{f_\eta^2}{K_a}\right\}$$

When the matched filter is not used, each single polarization image may fail to be generated. After the operations 501 to 506 in the method according to an embodiment of the inventive concept are performed, azimuth IFFT 507 and 508 may be performed to obtain a VV-Pol SAR image 509, a VH-Pol SAR image 510, an HV-Pol SAR image 511, and an HH-Pol SAR image 512.

It is shown that VV polarization, VH polarization, HV polarization, and HH polarization are determined in operation 503 of FIG. 5. However, the method according to an embodiment of the inventive concept may perform RCMC with respect to the VV/HV-Pol data set and the VH/HH-Pol data set in which the azimuth FFT is performed, may perform conjugate azimuth compression, and may azimuth IFFT to obtain a VV-Pol SAR image and a VH-Pol SAR image. The method according to an embodiment of the inventive concept may perform RCMC with respect to the VV/HV-Pol data set and the VH/HH-Pol data set in which the azimuth FFT is performed, may perform azimuth compression, and may perform azimuth IFFT to obtain an HV-Pol SAR image and an HH-Pol SAR image.

Figure 6:
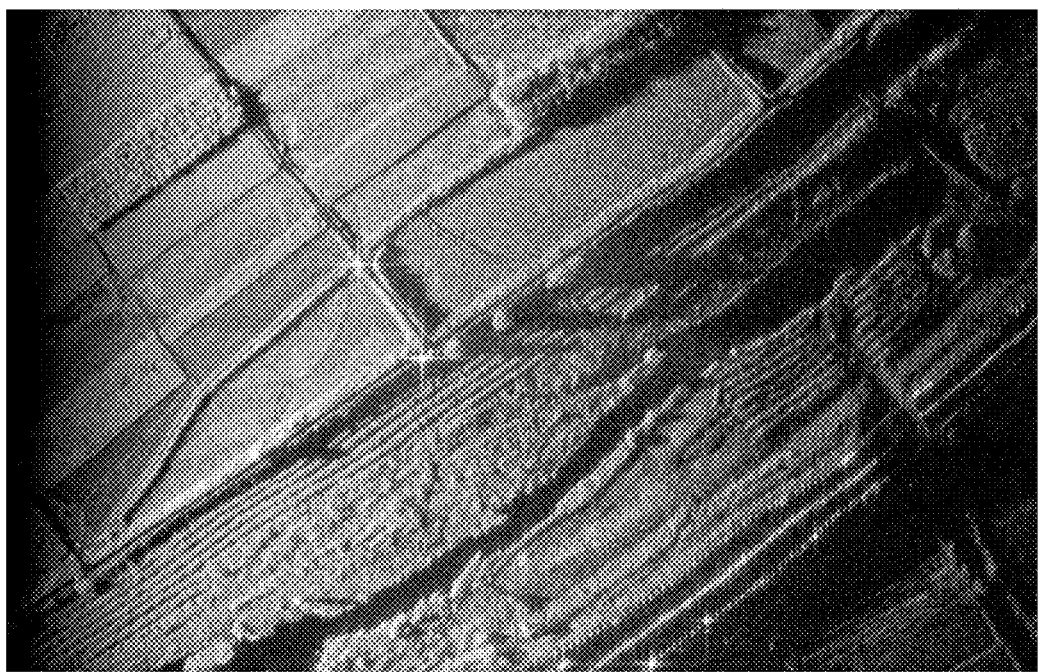
FIG. 6 is a drawing illustrating an FMCW radar image processed by single polarization according to an embodiment of the inventive concept.
Figure 7:
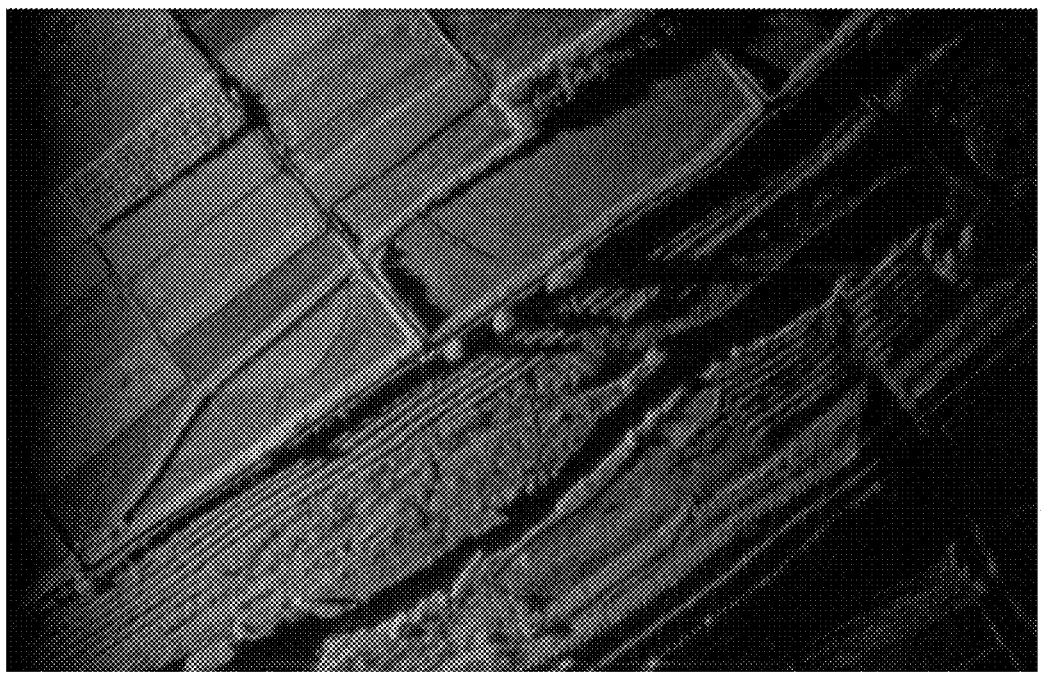
FIG. 7 is a drawing illustrating a color-coded image of a fully polarimetric FMCW image radar according to an embodiment of the inventive concept.

As such, the image radar system and the image processing method according to an embodiment of the inventive concept may obtain a fully polarimetric radar image. As an example, FIG. 6 is a drawing illustrating an FMCW radar image processed by single polarization according to an embodiment of the inventive concept. FIG. 6 illustrates an image obtained using a VV-Pol radar image among VV-Pol, VH-Pol, HV-Pol, and HH-Pol radar images. As another example, FIG. 7 is a drawing illustrating a color-coded image of a fully polarimetric FMCW image radar according to an embodiment of the inventive concept. Color grading of VV-Pol, VH-Pol, HV-Pol, and HH-Pol radar images may be performed using Pauli coded representation which is commonly used. It may be seen that a high-resolution color-coded image is obtained by performing the color grading.

The foregoing devices may be realized by hardware elements, software elements and/or combinations thereof. For example, the devices and components illustrated in the exemplary embodiments of the inventive concept may be implemented in one or more general-use computers or special-purpose computers, such as a processor, a controller, an arithmetic logic unit (ALU), a digital signal processor, a microcomputer, a field programmable array (FPA), a programmable logic unit (PLU), a microprocessor or any device which may execute instructions and respond. A processing unit may implement an operating system (OS) or one or software applications running on the OS. Further, the processing unit may access, store, manipulate, process and generate data in response to execution of software. It will be understood by those skilled in the art that although a single processing unit may be illustrated for convenience of understanding, the processing unit may include a plurality of processing elements and/or a plurality of types of processing elements. For example, the processing unit may include a plurality of processors or one processor and one controller. Also, the processing unit may have a different processing configuration, such as a parallel processor.

Software may include computer programs, codes, instructions or one or more combinations thereof and may configure a processing unit to operate in a desired manner or may independently or collectively control the processing unit. Software and/or data may be permanently or temporarily embodied in any type of machine, components, physical equipment, virtual equipment, computer storage media or units or transmitted signal waves so as to be interpreted by the processing unit or to provide instructions or data to the processing unit. Software may be dispersed throughout computer systems connected via networks and may be stored or executed in a dispersion manner. Software and data may be recorded in one or more computer-readable storage media.

The methods according to the above-described exemplary embodiments of the inventive concept may be implemented with program instructions which may be executed through various computer means and may be recorded in computer-readable media. The media may also include, alone or in combination with the program instructions, data files, data structures, and the like. The program instructions recorded in the media may be designed and configured specially for the exemplary embodiments of the inventive concept or be known and available to those skilled in computer software. Computer-readable media include magnetic media such as hard disks, floppy disks, and magnetic tape; optical media such as compact disc-read only memory (CD-ROM) disks and digital versatile discs (DVDs); magneto-optical media such as floptical disks; and hardware devices that are specially configured to store and perform program instructions, such as read-only memory (ROM), random access memory (RAM), flash memory, and the like. Program instructions include both machine codes, such as produced by a compiler, and higher level codes that may be executed by the computer using an interpreter.

According to embodiments of the inventive concept, the system may obtain an image using a fully polarimetric FMCW and may obtain a high-resolution fully polarimetric radar image through image processing of the obtained image.

According to embodiments of the inventive concept, the system may obtain a color-coded image which is easier to analyze geographic features than a single polarization radar technique using a fully polarimetric radar technique for obtaining an image using a total of 4 polarization, for example, HH polarization, HV polarization, VH polarization, and VV polarization.

According to embodiments of the inventive concept, the system may be configured based on an FMCW radar capable of making the system small to be fixed to a vehicle, and an image radar system which is concentrated in aerospace may be expanded to the field which is close to the real life.

According to embodiments of the inventive concept, the system may be configured based on a FMCW radar rather than a pulse radar system used for a conventional image radar to be favorable to low costs, small size, and low power. The complexity of the system may be reduced using a triangle wave frequency modulation method.

While a few exemplary embodiments have been shown and described with reference to the accompanying drawings, it will be apparent to those skilled in the art that various modifications and variations can be made from the foregoing descriptions. For example, adequate effects may be achieved even if the foregoing processes and methods are carried out in different order than described above, and/or the aforementioned elements, such as systems, structures, devices, or circuits, are combined or coupled in different forms and modes than as described above or be substituted or switched with other components or equivalents.

Therefore, other implements, other embodiments, and equivalents to claims are within the scope of the following claims.

What is claimed is:

1. An image radar system, comprising:
a signal generator configured to generate a frequency modulation signal which is linearly changed over time;
a transmitter configured to radiate the frequency modulation signal as vertical polarization and horizontal polarization at a pulse repetition interval using a vertically polarized transmit antenna and a horizontally polarized transmit antenna;
a receiver configured to receive a signal in which a vertically polarized signal and a horizontally polarized signal radiated at the pulse repetition interval are reflected from an object, using a vertically polarized receive antenna and a horizontally polarized receive antenna, and generate a vertical-to-vertical/horizontal-to-vertical (VV/HV) polarization data set including VV polarization data and HV polarization data and a vertical-to-horizontal/horizontal-to-horizontal (VH/HH) polarization data set including VH polarization data and HH polarization data based on the signal received via the vertically polarized receive antenna and the horizontally polarized receive antenna; and
a signal processor configured to obtain a fully polarimetric radar image based on bilateral symmetry correction and azimuth compression with respect to each of the VV/HV polarization data set and the VH/HH polarization data set,
wherein the signal processor performs range compression and azimuth fast Fourier transform (FFT) with respect to each of the VV/HV polarization data set and the VH/HH polarization data set, and performs range cell migration correction (RCMC) with respect to each of the data sets on which the azimuth FFT is performed;
performs bilateral symmetry correction with respect to the VV polarization data and the VH polarization data on which the RCMC is performed, and performs azimuth inverse FFT (IFFT) to obtain a VV polarization radar image and a VH polarization radar image; and
performs azimuth compression with respect to the HV polarization data and the HH polarization data on which the RCMC is performed, and performs azimuth IFFT to obtain an HV polarization radar image and an HH polarization radar image.

2. The image radar system of claim 1, wherein the signal processor obtains the fully polarimetric radar image, irrespective of information about the pulse repetition interval.

3. An image radar system, comprising:
a signal generator configured to generate a frequency modulation signal which is linearly changed over time;
a transmitter configured to radiate the frequency modulation signal as vertical polarization and horizontal polarization at a pulse repetition interval using a vertically polarized transmit antenna and a horizontally polarized transmit antenna;
a receiver configured to receive a signal in which a vertically polarized signal and a horizontally polarized signal radiated at the pulse repetition interval are reflected from an object, using a vertically polarized receive antenna and a horizontally polarized receive antenna, and generate a vertical-to-vertical/horizontal-to-vertical (VV/HV) polarization data set including VV polarization data and HV polarization data and a vertical-to-horizontal/horizontal-to-horizontal (VH/HH) polarization data set including VH polarization data and HH polarization data based on the signal received via the vertically polarized receive antenna and the horizontally polarized receive antenna; and
a signal processor configured to obtain a fully polarimetric radar image based on bilateral symmetry correction and azimuth compression with respect to each of the VV/HV polarization data set and the VH/HH polarization data set,
wherein each of the vertically polarized transmit antenna, the horizontally polarized transmit antenna, the vertically polarized receive antenna, the horizontally polarized receive antenna includes a corrugated horn antenna.

4. An image radar operation method, comprising:
generating a frequency modulation signal which is linearly changed over time;
radiating the frequency modulation signal as vertical polarization and horizontal polarization at a pulse repetition interval using a vertically polarized transmit antenna and a horizontally polarized transmit antenna;
receiving a signal in which a vertically polarized signal and a horizontally polarized signal radiated at the pulse repetition interval are reflected from an object, using a vertically polarized receive antenna and a horizontally polarized receive antenna;
generating a VV/HV polarization data set including VV polarization data and HV polarization data and a VH/HH polarization data set including VH polarization data and HH polarization data based on the signal received via the vertically polarized receive antenna and the horizontally polarized receive antenna; and
obtaining a fully polarimetric radar image based on bilateral symmetry correction and azimuth compression with respect to each of the VV/HV polarization data set and the VH/HH polarization data set,
wherein the radiating includes:
switching the frequency modulation signal at the pulse repetition interval; and
converting the switched frequency modulation signal into a predetermined frequency band and sequentially provide the converted signal to the vertically polarized transmit antenna and the horizontally polarized transmit antenna to radiate the vertically polarized signal and the horizontally polarized signal.

* * * * *